(12) United States Patent
Schomburg

(10) Patent No.: US 6,478,062 B1
(45) Date of Patent: Nov. 12, 2002

(54) METHOD OF SHAPING TREAD PATTERNS FOR VEHICLE TIRES AND VEHICLE TIRES SHAPED IN ACCORDANCE THEREWITH

(75) Inventor: Jurgen Schomburg, Rodenbach (DE)

(73) Assignee: Dunlop GmbH, Hanau (DE)

( * ) Notice: Subject to any disclaimer, the term of this patent is extended or adjusted under 35 U.S.C. 154(b) by 0 days.

(21) Appl. No.: 09/330,192

(22) Filed: Jun. 11, 1999

(30) Foreign Application Priority Data

Jun. 18, 1998 (DE) .......................................... 198 27 244
Sep. 28, 1998 (DE) .......................................... 198 44 437

(51) Int. Cl.$^7$ ........................ B29D 30/52; B60C 11/12; B60C 119/00
(52) U.S. Cl. ............................. 152/209.15; 152/209.18; 152/209.22; 152/209.25; 152/904; 152/DIG. 3; 156/110.1
(58) Field of Search .................... 152/209.3, 209.15, 152/209.17, 209.18, 209.22, 209.25, DIG. 3, 904; 156/110.1

(56) References Cited

U.S. PATENT DOCUMENTS

| | | | | | |
|---|---|---|---|---|---|
| 2,670,777 | A | * | 3/1954 | Wallace | ................. 152/209.15 |
| 4,934,424 | A | * | 6/1990 | Kojima | ................. 152/209.25 |
| 5,322,107 | A | * | 6/1994 | Lagnier | ...................... 152/904 |
| 5,591,280 | A | * | 1/1997 | Asano | ................... 152/209.25 |
| 5,714,026 | A | * | 2/1998 | Wakabayashi | ........... 156/110.1 |
| 5,871,598 | A | * | 2/1999 | Tomita | .................. 152/209.22 |
| 5,909,756 | A | * | 6/1999 | Miyazaki | ............... 152/DIG. 3 |
| 6,142,200 | A | * | 11/2000 | Feider et al. | .......... 152/209.22 |
| 6,148,886 | A | * | 11/2000 | Takasugi et al. | ............. 152/904 |

FOREIGN PATENT DOCUMENTS

| | | | | |
|---|---|---|---|---|
| DE | 3901624 | * | 8/1989 | .................. 152/904 |
| DE | 4232306 | * | 3/1994 | ............ 152/209.25 |
| EP | 348335 | * | 12/1989 | ............ 152/209.22 |
| EP | 718125 | * | 6/1996 | ............ 152/DIG. 3 |
| JP | 61-27708 | * | 2/1986 | .............. 152/209.3 |
| JP | 2-241804 | * | 9/1990 | ............ 152/209.25 |
| JP | 3-92403 | * | 4/1991 | ............ 152/209.22 |
| JP | 3-197208 | * | 8/1991 | ............ 152/DIG. 3 |
| JP | 7-186633 | * | 7/1995 | ............ 152/209.15 |
| JP | 7-228109 | * | 8/1995 | .............. 152/209.3 |
| JP | 8-216627 | * | 8/1996 | ............ 152/DIG. 3 |
| JP | 8-276709 | * | 10/1996 | ............ 152/DIG. 3 |
| JP | 8-324211 | * | 12/1996 | ............ 152/DIG. 3 |
| JP | 9-2027 | * | 1/1997 | .............. 152/209.3 |

* cited by examiner

*Primary Examiner*—Steven D. Maki
(74) *Attorney, Agent, or Firm*—Birch, Stewart, Kolasch & Birch, LLP

(57) ABSTRACT

The present invention is directed to A plurality of vehicle tires having tread patterns of substantially the same outer appearance, wherein the tread patterns comprise a primary tread pattern comprising blocks and/or ribs separated by broad cut-outs and a secondary tread pattern on the blocks and/or ribs of the primary tread pattern comprising fine cuts. At least one vehicle tire has fine cuts of low depth and at least one different tire has sections of the fine cuts that have a different depth of fine cuts. The at least one vehicle tire has different driving characteristic from the at least one different vehicle tire. The advantage of the vehicle tires of the present invention is that a performance characteristic of the tire can be chosen by altering the structure of specific sections of the tire, without varying the fundamental opial appearance of the tire.

24 Claims, 6 Drawing Sheets

Figure 1:
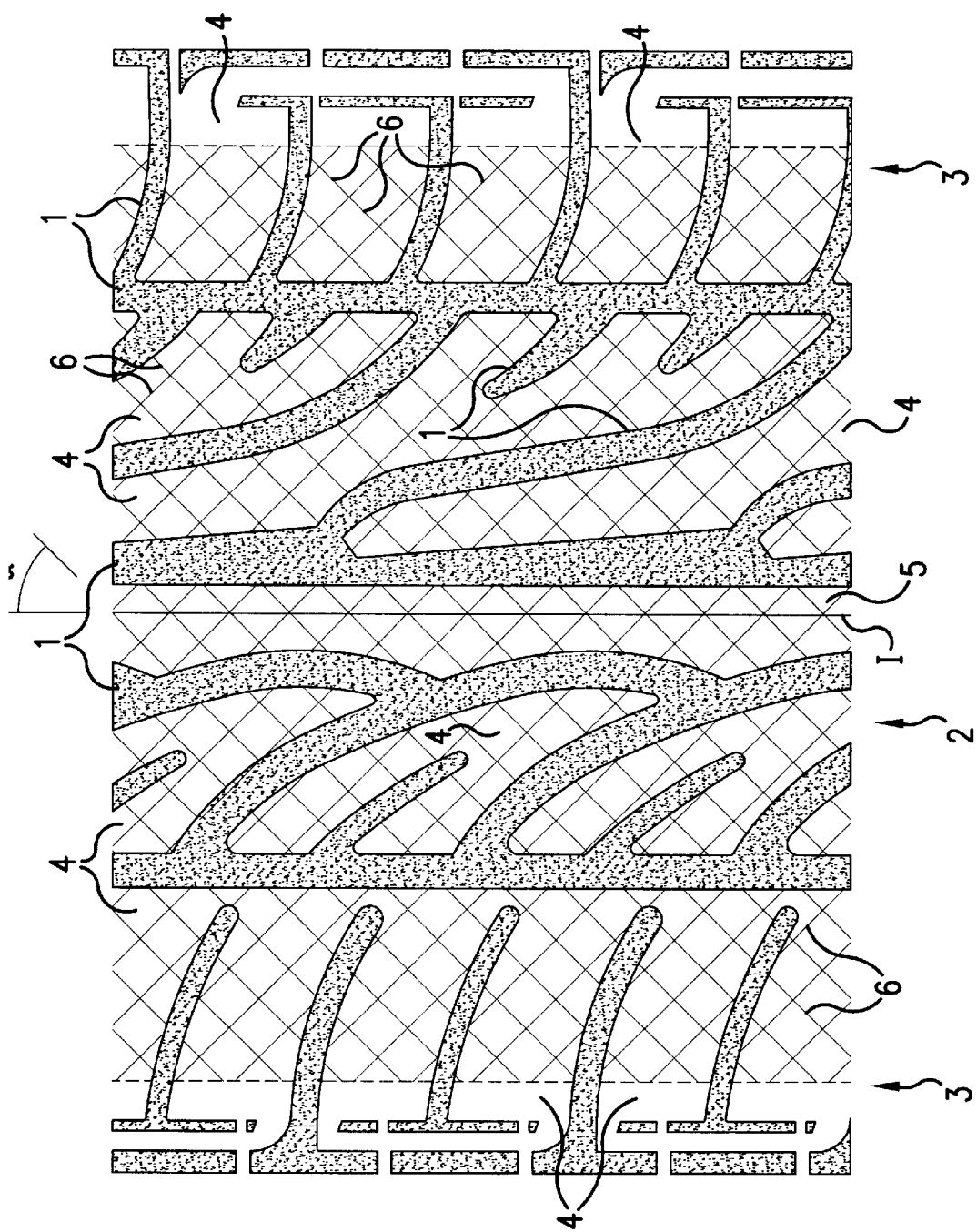

METHOD OF SHAPING TREAD PATTERNS FOR VEHICLE TIRES AND VEHICLE TIRES SHAPED IN ACCORDANCE THEREWITH

The present invention relates to a method of shaping a plurality of tread patterns for motor vehicles, which bring about driving characteristics which differ from one another and which have tread blocks and/or tread ribs separated from one another by broad cut-outs and a plurality of find cuts in the tread blocks and/or tread ribs and also to vehicle tires shaped in accordance therewith.

The driving characteristics of motor vehicle tires are substantially determined by the kind, number and arrangement of the tread blocks and tread ribs which are formed by the introduction of broad cut-outs into the tread surface. The most diverse embodiments of motor vehicle tires with such tread blocks and tread ribs are known, which are selected in accordance with the desired driving characteristic, i.e. in accordance with the main intended purpose.

Moreover, it is known to provide fine lamella-like cuts or sipes in the tread blocks and tread ribs in order to further influence the driving characteristics of the tire. For example, in winter tires, such lamella cuts are used to improve the traction of the tire on snow. The external appearance of the tire is admittedly also influenced by these lamella cuts. This impression is, however, mainly determined by the tread blocks and tread ribs. This means that vehicle tires with different driving characteristics also have a considerably different appearance and this is a disadvantage in that tuning a tire's pattern for a given performance causes an inevitable changes in its appearance.

The invention is now based on the object of setting forth a method of shaping tread patterns for vehicle tires with which tread patterns with different driving characteristics can be shaped, which nevertheless have essentially a corresponding same outer appearance.

Accordingly the object is satisfied in that a basic pattern of tread blocks and/or tread ribs is specified which determines the basic characteristics of the tire tread and which is the same for all tread patterns characterized by a pattern of fine surface cuts is additionally specified, which is substantially the same for all tread patterns, with the surface cuts being in each case basically introduced into the tread blocks and/or tread ribs of the tire with a low depth which does not substantially influence the driving characteristics of the tire, and in that, depending on the desired driving characteristic of the relevant tread pattern, sections of the fine cuts of this pattern are selected which are to be formed at least with a greater depth which co-determined the driving characteristics of the tire.

By the designing of all tread patterns with a corresponding basic pattern of tread blocks and/or tread ribs and with a corresponding pattern comprising a plurality of fine surface cuts, all the tread patterns have a corresponding outer appearance through the method of the invention. The surface cuts have essentially no influence on the driving characteristics of the vehicle tire, but rather serve solely for the optical design. However in order to be able to provide variation in driving characteristics of the tread patterns to give different performance characteristics, the fine surface cuts are formed section-wise with a greater depth, so that these sections co-determine the driving characteristics of the tire. The deepening section-wise does not, however, change the outer appearance of the vehicle in practice so that a change of the driving characteristics is possible without changing the outer appearance. Thus with the method of the invention, vehicle tires with different driving characteristics can be provided, which nevertheless have a common appearance.

In accordance with one embodiment of the invention, the fine cuts in the non-deepened sections have a depth of about 1 mm. In this way an influence on the driving characteristics is, on the one hand, precluded, and, on the other hand, a common optical appearance of the tires is provided.

In accordance with a further design of the invention the deepened suctions are also broadened somewhat in comparison to the fine surface cuts.

A first further development lies in the fact that the fine cuts at least partly have interruptions. In this way the appearance of the tire can be varied. Moreover, the basic characteristics of the vehicle tire are less strongly influenced than with uninterrupted cuts.

In accordance with a further embodiment of the present invention, the fine cuts end at least partly at a distance from the edges of the tread blocks and/or tread ribs. The optical appearance can also be varied further in this way. Moreover, the basic characteristics of the tire, which are pre-set by the tread block and the tread ribs, are also less strongly changed here.

A particular optical effect also results from the fact that, hn accordance with a further design of the invention, an encircling line formed as a fine cut is provided in at least some of the tread blocks and/or ribs at a small distance from the edge of the respective tread block or of the respective tread rib. The remaining fine cuts of the respective tread block or of the respective tread are in this arrangement in particular only provided within the region enclosed by the encircling line.

In accordance with a further embodiment of the invention, no fine cuts are present in selected regions of the tread pattern. The tread blocks or ribs in respective tread rib are in this arrangement in particular only provided within the region enclosed by the encircling line.

In accordance with a further embodiment of the invention, no fine cuts are present in selected regions of the tread pattern. The tread blocks or ribs in the shoulder region of the tire can in particular be formed without fine cuts. In this way the influencing of the basic characteristics of the tire by the pattern of fine cuts is also kept low. In addition, a further possibility of varying the optical appearance results.

The design of tread patterns with different driving characteristics can be additionally brought about by variation of the depths and of the widths and also of the lengths of said sections of the fine cuts. These sections can also be distinguished from one another and indeed both in one tire and also from tire to tire. The outer appearance of the tire is also advantageously not changed hereby.

In accordance with one embodiment of the invention, the fine cuts are arranged in a rhombus pattern. In this respect different rhombus angles are possible. In the same way one pattern of the fine cuts can be provided of non-crossing, preferably wave-shaped lines. Both variants result in large freedom in the determining of the desired running characteristics of the tire.

In accordance with a further embodiment of the invention, the fine cuts are arranged in a differently designed pattern over the width of the tire and/or over the circumference of the tire. In this way further possibilities of varying the running characteristics of the tire result. In particular the spacing and/or the angle of the lines of the pattern of find cuts can be selected differently relative to one another over the width of the tire and/or over the circumference of the tire.

In accordance with a further design of the invention, the lines of the pattern comprises fine cuts with an angle of inclination to the circumferential direction of the tire of ca.

30° to ca. 60°, in particular ca. 40° to ca. 50°. These angles of inclination have proved to be particularly advantageous in order to influence the running characteristics of the tire by section-wise deepening of the fine cuts.

In accordance with a further embodiment of the invention, the lines of the pattern of fine cuts have a spacing of ca. 5 to ca. 20 mm, in particular ca. 8 to ca. 12 mm. This has also proved advantageous for setting the desired running characteristics of the tire by section-wise deepening of the cuts.

According to another aspect of the invention a vehicle tire manufactured in accordance with the method of the invention has a tread pattern which includes tread blocks and/or tread ribs separated by broad cut-out grooves by which the basics characteristics of the tire are determined, characterized by a plurality of fine cuts in the tread blocks and/or in the tread ribs which are only introduced into the tread surface with a reduced depth, such that they do not substantially affect the driving characteristics of the tire. The fine cuts can in this arrangement have different depths and/or widths and also lengths, so that the vehicle tires of the invention can have respectively differing running characteristics with the same outer appearance. For one and the same vehicle tire the depth of the deepened sections of the fine cuts, their width and their length can at least be partly different.

Figure 2:
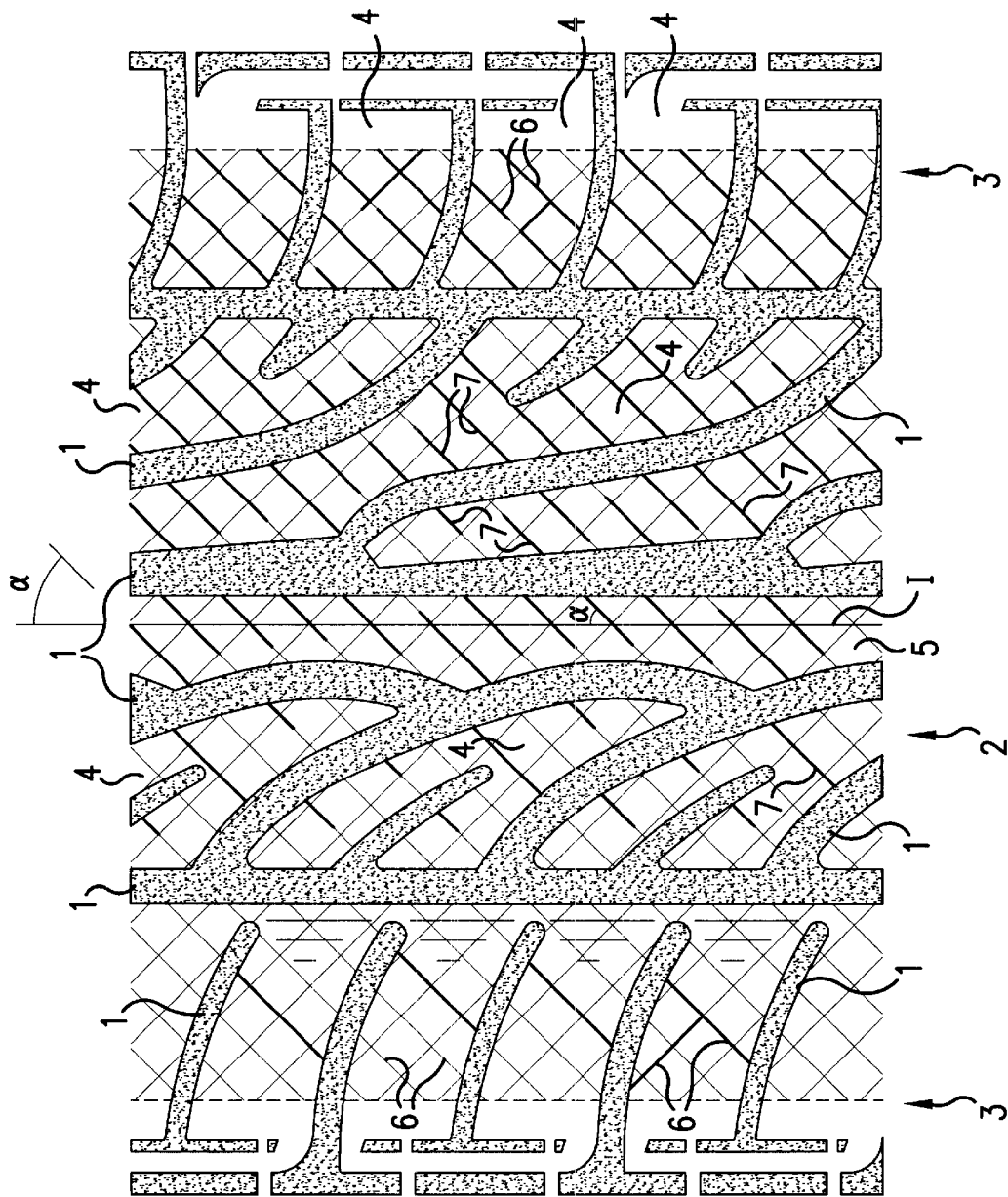
Figure 3:
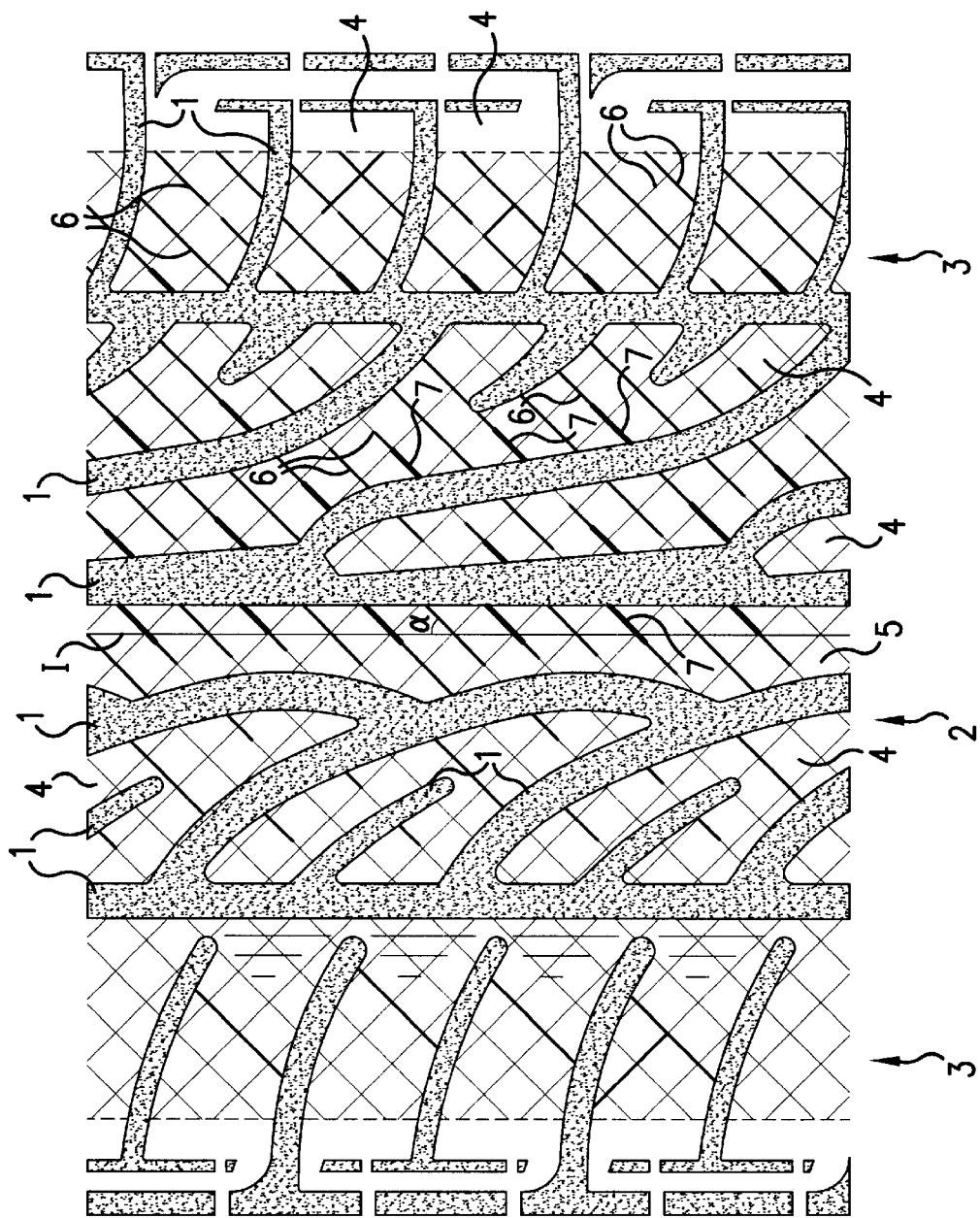
Figure 4:
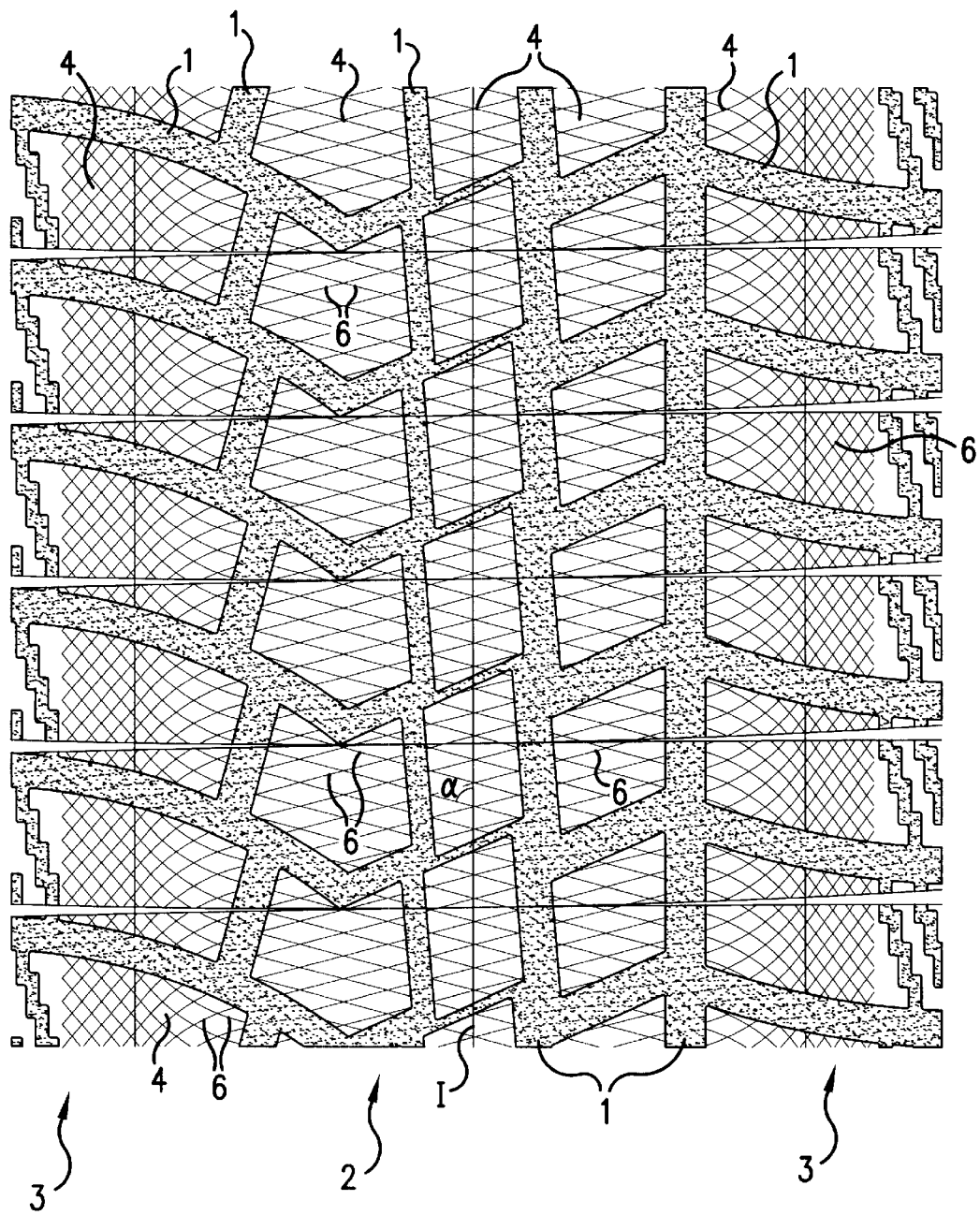
Figure 5:
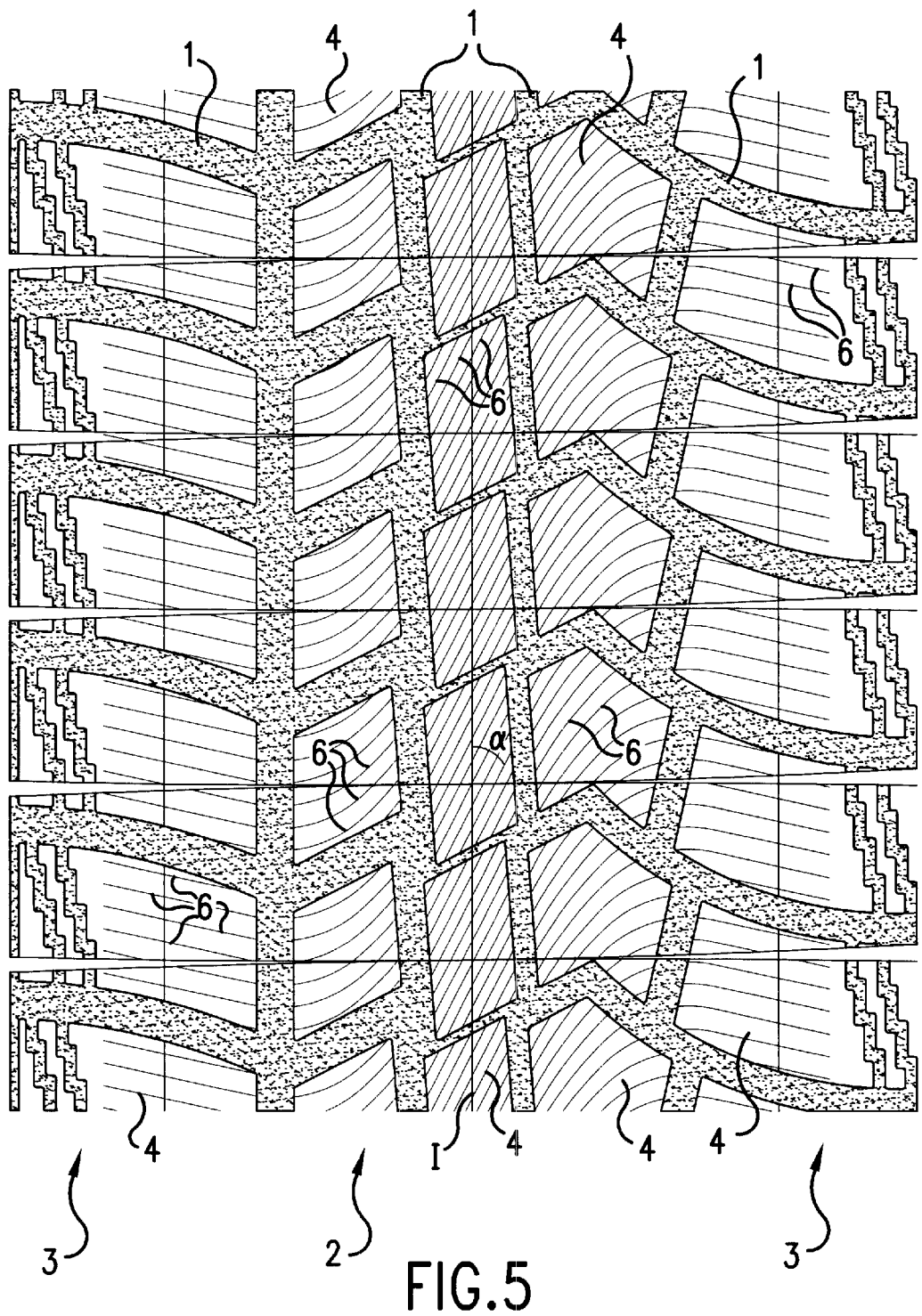
Figure 6:
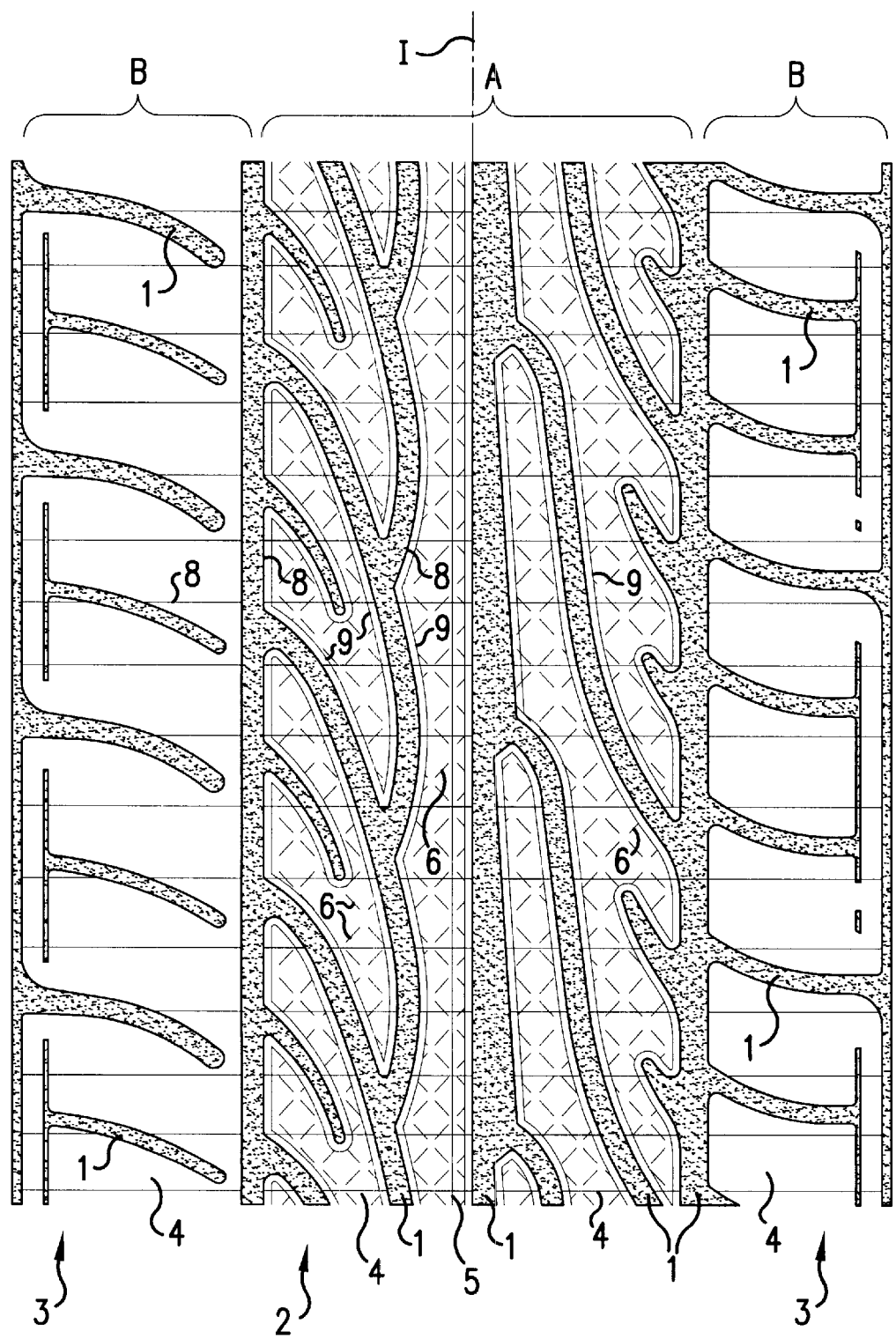

Embodiments of the invention are shown in the drawings and will be described in the following. There are shown, in each case in schematic representation:

FIG. 1 a plan view of a tread section of a vehicle tire with tread block and tread ribs and also fine surface cuts;

FIG. 2 a plan view of the tread section of FIG. 1, with fine cuts which are deepened section-wise;

FIG. 3 a plan view of the tread section of FIG. 1, with fine cuts which are deepened section-wise in a second variant;

FIG. 4 a plan view of a tread section of a variant of the vehicle tire of the invention;

FIG. 5 a plan view of a tread section of a further variant of the vehicle tire of the invention; and FIG. 6 a plan view of a tread section in which the fine surface cuts are interrupted lines.

The tread pattern shown in FIG. 1 has a number of broad cut-outs or main tread pattern defining grooves 1, which are provided in the tread surface 2 of the tire and also partly in the side regions 2 of the tire. These broader grooves 1 form tread blocks 4 and also a tread rib 5 at the center of the tire. In addition to the broad cut-outs 1 fine cuts 6 are introduced at the surface in the tread 2 into the tread blocks 4 and into the tread ribs 5. The fine cuts 6 are arranged in a rectangular rhombus pattern, which is evenly laid over the tread surface 2. The tread pattern that is shown continues in corresponding manner along the central, peripheral line I.

The broad cut-outs and tread blocks 4 and the tread ribs 5 from the basic pattern of the present tread pattern, by which the basic driving characteristics of the tire are determined. The fine cuts 6, which are introduced with a depth of only ca. 1 mm into the tread blocks 4 and the tread ribs 5, have in contrast only an insignificant influence on the driving characteristics. They simply determine, together with the broad cut-outs 1 and the tread blocks 4 and the tread ribs 5, the outer appearance of the tire.

In order to now be able to vary the driving characteristics of the tire without changing the outer appearance, the fine cuts 6 are deepened section-wise in localized areas. A special design of a tread pattern with fine cuts 6 deepened section-wise is shown in FIG. 2. Another special embodiment is shown in FIG. 3. The deepened sections 7 of the fine cuts 6 are in this arrangement shown by thicker lines. This does not necessarily mean that the fine lines 6 in the sections 7 also actually have a greater width. It is, however, entirely possible to also design these sections at least partly with a greater width in addition to the greater depth. The deep sections 7 now additionally influence the driving characteristics of the tire. The tread patterns shown in FIGS. 1 to 3 thus each signify tires with respectively different driving characteristics. As one can see, tires with different driving characteristics can be provided thereby, but which nevertheless have a common outer appearance.

Practically any desired variations are possible, both with respect to the basic pattern of broad cut-outs 1, tread blocks. 4 and tread ribs 5, and also with respect of the pattern of fine cuts 6, so that the common outer appearance of the tire with different driving characteristics can also be selected differently. Two further examples of a basic pattern with broad. cut-outs 1 and tread blocks 4 and also a pattern of fine surface cuts 6 provided in the tread blocks 4 are shown in FIG. 4, the fine cuts 6 run in a central region of the tread along a non-rectangled rhomboid pattern, which merges in the two edge regions of the tread into a right-angled rhombus pattern. In the variant of FIG. 5 the fine cuts 6 extend partly along curved lines. In both cases the pattern of fine cuts 6 thus changes over the width of the tire. Almost any desired further possibilities of variation to this are also present.

The fine cuts 6 of the FIGS. 4 and 5 are formed deeper section-wise for the design of tires with different driving characteristics, but outwardly with the common appearance of the pattern of FIG. 4 or FIG. 5, in just the same way as in the example of the FIGS. 1 to 3.

The embodiment in FIG. 6 has a plurality of broad cut-outs 1, which are provided in differing manner in the tread surface 2 and partly also in the tire side regions 3. The tread blocks 4 and also a tread rib 5 at the center of the tire are formed by the broad cut-outs 1.

In addition to the broad cut-outs 1, fine cuts 6 are introduced .n a central tread region A at the surface into the tread blocks 4 and into the tread ribs 5, whereas in the two shoulder regions B of the tire no fine cuts are present in the tread blocks 4. The fine cuts 6 are arranged in a right-angle rhombus pattern, with the lines being interrupted. In addition, fine cuts are provided in the shape of encircling lines 9 at a small distance from the side of the broad cut-outs 1, i.e. a small distance from the tread block edges.

The broad cut-outs 1 and the tread blocks 4 as well as the tread rib 5 form the basic pattern of the present tread pattern, by which the basic driving characteristics of the tire are determined. The fine cuts 6 and the encircling lines 9, which are in particular introduced with a depth of only ca. 1 mm into the tread blocks 4 and into the tread rib 5, have in contrast an insignificant influence on the driving characteristics. They simply determine, together with the broad cut-outs 1 and the tread block 4 and also the tread rib 5, the external appearance of the tire.

In order to now be able to vary the driving characteristics of the tire without changing the outer appearance, the fine cuts 6, but also the encircling lines 9, can be made deeper section-wise. In addition to a greater depth, these sections can also be formed with a greater width. These sections now additionally influence the driving characteristics of the tire.

Practically any desired variations are possible, both with respect to broad cut-outs, tread blocks 4 and tread ribs 5, as well as with respect to the pattern of fine cuts 6 and encircling lines 9, so that the corresponding outer appearance of the tire can be differently selected with different driving characteristics. The illustrated features of the fine cuts 6 and of the encircling lines 9 can in each case be provided separately and in any desired combination with one another. Instead of a rhombus pattern, any other desired pattern can also be provided, for example curved lines, in particular wave-shaped lines, which, in accordance with the illustrated embodiment, can be interrupted, and have a spacing from the edge 8 of the tread blocks 4 and of the tread rib 5 and can in each case only be provided within a fine cut formed as an encircling line 9. The pattern of the fine cuts 6, their spacing and/or angle can also be varied over the width of the tire and/or over the circumference of the tire.

In total, tread patterns for vehicle tires thus result which can be varied without changing their outer appearance in order to be able to form a series of vehicle tires with the same appearance, but with different driving characteristics. The manufacturing process is in this arrangement not complicated and not costly.

What is claimed is:

1. A plurality of vehicle tires having tread patterns of substantially the same outer appearance, wherein the appearance of each of the tread patterns comprises:

a primary tread pattern comprising blocks and/or ribs separated by broad cut-outs; and a secondary tread pattern comprising fine cuts on the blocks and/or ribs of the primary tread pattern, wherein at least one said tire has said fine cuts provided with a low depth and at least one different tire has said fine cuts provided with a low depth and has sections of the low depth fine cuts having a deeper depth so that said at least one tire has different driving characteristics from said at least one different tire.

2. The plurality of vehicle tires according to claim 1, wherein said at least one different tire has sections of the fine cuts with a depth different from other sections of the fine cuts on said at least one different tire.

3. The plurality of vehicle tires according to claim 1, wherein the fine cuts are arranged in a rhombus pattern.

4. The plurality of vehicle tires according to claim 1, wherein the fine cuts are arranged in a pattern of non-crossed, wave-shaped lines.

5. The plurality of vehicle tires according to claim 1, wherein the secondary tread pattern varies over the width and/or circumference of said vehicle tires.

6. The plurality of vehicle tires according to claim 1, wherein the fine cuts have an angle of inclination ($\alpha$) with respect to the circumferential direction of the tire ranging from 30° to 60°.

7. The plurality of vehicle tires according to claim 1, wherein the fine cuts have an angle of inclination ($\alpha$) with respect to the circumferential direction of the tire ranging from 40° to 50°.

8. The plurality of vehicle tires according to claim 1, wherein the fine cuts have a spacing ranging from 5 mm to 20 mm.

9. The plurality of vehicle tires according to claim 1, wherein the fine cuts having a spacing ranging from 8 mm to 12 mm.

10. The plurality of vehicle tires according to claim 1, wherein the low depth of the fine cuts is about 1 mm.

11. The plurality of vehicle tires in accordance with claim 1 wherein the fine cuts (6) are arranged in a pattern of non-crossing lines.

12. A method of for forming a plurality of tread patterns for tires of motor vehicles, which brings about driving characteristics of the tires which differ from one another, comprising forming tread patterns such that each tread pattern comprises tread blocks (4) and/or tread ribs (5), separated from one another by broad cut-outs (1) and a pattern of fine cuts (6) in the tread blocks (4) and/or ribs (5), the visual appearance of said fine surface cuts (6) being formed the same for all tread patterns, and the fine cuts having a low depth wherein a section (7) of fine cuts (6) of at least one of the patterns is formed with a greater depth so that a tire having said at least one of said patterns has different driving characteristics than at least one different tire having another of said patterns.

13. A method in accordance with claim 12, wherein the fine cuts (6) have a depth of about 1 mm in the non-deepened sections.

14. A method according to claim 12, wherein the fine cuts (6) are formed at least partly as interrupted lines.

15. A method in accordance with claim 14 wherein the fine cuts (6) are arranged in a rhombus pattern.

16. A method in accordance with claim 12, comprising broadening of the fine cuts (6) at least partly in addition to forming the greater depth.

17. A method in accordance with claim 12, wherein the depth of the fine cuts (6) in the deepened sections (7) is varied to obtain different depths with resultant different driving characteristics of the respective tire.

18. A method in accordance with claim 12, wherein the lehgth of the deepened sections (7) is varied to obtain different driving characteristics of the respective tire without affecting the visual appearance of the pattern.

19. A method in accordance with claim 12, wherein the fine cuts (6) are arranged in rhombus pattern.

20. A method in accordance with claim 12, wherein the fine cuts (6) are arranged in a pattern of non-crossing lines.

21. A method in accordance with claim 12, wherein the fine cuts (6) are arranged in a pattern which varies over the width of the tire and/or over the circumference of the tire.

22. A method in accordance with claim 12, wherein the spacing and/or the angle of the fine cuts (6) with respect to the circumferential direction are selected differently among one another over the width of the tire and/or over the circumference of the tire.

23. A method in accordance with claim 12, wherein the fine cuts (6) are provided with an angle of inclination with respect to the circumferential direction (I) of the tire of about 30° to 60°.

24. A method in accordance with claim 12, wherein the fine cuts (6) are provided with a spacing from one another of about 5 to about 20 mm.

* * * * *